(12) United States Patent  
Motokawa

(10) Patent No.: US 6,610,929 B1
(45) Date of Patent: Aug. 26, 2003

(54) WIRE HARNESS FOR REMOVING FROM A VEHICLE

(75) Inventor: Masatomo Motokawa, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/459,654

(22) Filed: Dec. 13, 1999

(30) Foreign Application Priority Data

| Jan. 12, 1999 | (JP) | ................................ | 11-005341 |
| Jan. 12, 1999 | (JP) | ................................ | 11-005455 |
| Feb. 12, 1999 | (JP) | ................................ | 11-034584 |
| Sep. 14, 1999 | (JP) | ................................ | 11-260645 |

(51) Int. Cl.$^7$ ............................................... H02G 3/00
(52) U.S. Cl. .................. 174/72 A; 174/135; 24/16 PB; 248/74.3
(58) Field of Search .................... 174/71 R, 72 R, 174/72 A, 135, 136, 138 R; 24/16 PB, 30.5 P, 563, 453, 456; 248/65, 68.1, 71, 73, 74.1, 74.3

(56) References Cited

U.S. PATENT DOCUMENTS

| 2,931,851 | A | * | 4/1960 | Sims | 174/40 CC |
| 2,936,980 | A | * | 5/1960 | Rapata | 24/30.5 P |
| 3,114,184 | A | * | 12/1963 | Bigaouette | 24/30.5 P |
| 3,210,030 | A | * | 10/1965 | Ramsey et al. | 248/73 |
| 4,226,036 | A | * | 10/1980 | Krug | 24/16 PB |
| 4,501,354 | A | * | 2/1985 | Hoffman | 24/16 PB |
| 4,673,150 | A | * | 6/1987 | McSherry et al. | 248/73 |
| 4,854,015 | A | | 8/1989 | Shaull | |
| 4,871,134 | A | * | 10/1989 | Oikawa | 248/63 |
| 5,168,603 | A | * | 12/1992 | Reed | 24/16 PB |
| 5,197,164 | A | * | 3/1993 | Meier | 24/16 PB |
| 5,301,907 | A | * | 4/1994 | Julian | 174/135 |
| 5,362,018 | A | * | 11/1994 | Darr et al. | 24/16 PB |
| 5,367,126 | A | | 11/1994 | Kikuchi | |
| 5,480,203 | A | | 1/1996 | Favalora et al. | |
| 5,487,209 | A | * | 1/1996 | Oetiker | 24/20 R |
| 5,581,850 | A | * | 12/1996 | Acker | 24/16 PB |
| 5,615,293 | A | | 3/1997 | Sayegh | |
| 5,760,338 | A | * | 6/1998 | Suzuki | 174/135 |
| 5,775,653 | A | * | 7/1998 | Horney et al. | 24/16 PB |
| 5,911,450 | A | * | 6/1999 | Shibata et al. | 174/112 |
| 6,042,062 | A | * | 3/2000 | Sugiyama | 174/72 A |
| 6,102,347 | A | * | 8/2000 | Benoit | 248/16 PB |
| 6,149,109 | A | * | 11/2000 | Stankowski | 24/16 PB |
| 6,192,554 | B1 | * | 2/2001 | Dumcum | 24/16 PB |
| 6,256,845 | B1 | * | 7/2001 | Tseng | 24/30.5 P |
| 6,398,170 | B1 | * | 6/2002 | Wada | 248/68.1 |
| 6,417,451 | B1 | * | 7/2002 | Uchiyama | 174/72 A |

FOREIGN PATENT DOCUMENTS

| EP | 0 535 712 | 4/1993 |
| GB | 2 231 635 | 11/1990 |
| JP | 09 025916 | 1/1997 |

\* cited by examiner

*Primary Examiner*—Dean A. Reichard
*Assistant Examiner*—Adolfo Nino
(74) *Attorney, Agent, or Firm*—Oliff & Berridge, PLC

(57) ABSTRACT

To mount a knob 10 onto a wire harness, at first, a belt portion 14 of the knob 10 is wound around the wire harness and an eye portion of the knob 10 is inserted through an elongated hole 20 formed in a base portion 12 of the knob 10. Next, tape is wound around not only the wire harness and the two end portions of the base portion 12 to thereby fix the base portion 12 to the wire harness. When dismantling a vehicle, a hook mounted on the leading end of a wire rope secured to a damper of a crane truck is secured to a circular eye 18 formed in the knob 10 and, after then, the wire harness is raised up by the crane truck.

5 Claims, 10 Drawing Sheets

WIRE HARNESS FOR REMOVING FROM A VEHICLE

BACKGROUND OF THE INVENTION

The present invention relates to a knob for use in a wire harness which, when a wire harness mounted in a vehicle is removed from the vehicle, can be used to remove the wire harness with enhanced removing operation efficiency, and also a wire harness incorporating the same therein.

As the recognition of environmental problems increases, an interest in the effective use of resources increases more and more. In such environmental problems, of course, there is included a problem as to a vehicle which is scrapped. Especially, an electronically controlled vehicle developed in recent years uses an enormous quantity of wire harnesses and thus such wire harnesses cannot be ignored in the present circumstances.

In view of such circumstances, even at present, the wire harness is recycled but there is raised a problem that it is not easy to remove the wire harness from the scrapped vehicle. This problem will be discussed below in detail with reference to FIGS. 1 and 2.

A wire harness 1 is produced by binding a plurality of wires into wire bundles W and winding tape 2 around the wire bundles W, while the wire harness 1 is connected to an electric system disposed within the vehicle through connectors 3 respectively coupled to the respective ends of the wire bundles W. Generally, a securing member, that is, a clamp 4 is firmly mounted on the intermediate portion of the wire harness 1 by tape 5 and thus, normally, the wire harness 1 is mounted into a vehicle body B using this clamp 4. The clamp 4 includes an anchor-shaped engaging portion 4a and, as shown in FIG. 2, by fitting this engaging portion 4a into a through hole 6 opened up in the vehicle body B, the wire harness 1 can be fixed to the vehicle body B.

In the wire harness 1 which is mounted into the vehicle by using the clamp 4, to remove the wire harness 1 from the vehicle, there is necessary manual labor in which a tensile force is applied to the clamp 4 to thereby forcibly pull out the clamp 4 from the through hole 6 of the vehicle body B and thus remove the same from the through hole 6. For this reason, a dealer who takes down a scrapped vehicle, that is, a wrecker often uses machine power such as a crane truck when taking out the wire harness 1 from the vehicle body B of the scrapped vehicle.

However, conventionally, it is not sufficiently considered a point contact of a wire harness with the machine power, and a clamp at a tip portion of the machine is often removed from a wire harness, even if the wire harness is clamped.

Further, a clamper or a gripping portion of the crane truck etc. is excessively large when compared with the outside diameter of the wire harness 1 and, therefore, to grip the wire harness 1 using the damper of the crane truck requires a delicate operation, which raises a problem that the wire harness 1 gripping and removing operation provides a poor operation efficiency.

Also, after the wire harness 1 is gripped by the damper of the crane truck, when separating the wire harness 1 from the vehicle body B, there is found a problem that the wire harness 1 is easy to slip off the damper of the crane truck. Of course, when the wire harness 1 slips off the damper of the crane truck, it is necessary to grip again the wire harness 1 by the damper of the crane truck. For these reasons, it takes time and labor to remove the wire harness 1 from the vehicle body B.

The above description is also applied to the wire harness 110 and 201 as well as the wire harness 1.

Further, in the wire harness 310 arranged in the vehicle using the clamp 304, when removing the wire harness 310 from the vehicle, there is required manual labor in which a tensile force is applied to the clamp 304 to thereby forcibly pull out the clamp 304 from the through hole 306 of the vehicle body B so as to remove the clamp 304 from the through hole 306.

SUMMARY OF THE INVENTION

The present invention aims at eliminating the drawbacks found in the conventional wire harness removing device as well as the conventional wire harness incorporating the same therein.

According to the 1st aspect of the invention, there is provided a knob for a wire harness comprising: a base portion extending along the wire harness in the axial direction thereof; a belt portion extending perpendicularly from the longitudinal-direction middle portion of the base portion and windable around the outer periphery of the wire harness; and an eye portion formed in the leading end portion of the belt portion and exposable outwardly of the wire harness, wherein, in the eye portion, there is formed an eye for securing a hook and, in the base portion, there is formed an elongated hole for passing the eye portion therethrough.

Also, according to the 2nd aspect of the invention, there is provided a knob for a wire harness comprising: a base portion extending along the wire harness in the axial direction thereof; a lip portion extending from the base portion and insertable through the wire harness in the diameter direction thereof; and an eye portion formed in the leading end portion of the lip portion and projectable outwardly of the wire harness, wherein, in the eye portion, there is formed an eye for securing a hook.

Further, according to the 3rd aspect of the invention, there is provided a wire harness incorporating a knob therein, the knob comprising an eye portion exposed outwardly of the wire harness and an eye formed in the eye portion for securing a hook.

In attaining the above object, according to the 4th aspect of the invention, there is provided a wire harness formed by binding together wire bundles with tape, wherein an intermediate portion of part wire of each of the wire bundle is exposed to the outside and the thus exposed part wire intermediate portion is rotated once to thereby form an eye for securing a hook of a crane truck when dismantling a vehicle.

In attaining the above object, according to the 5th aspect of the invention, there is provided a wire harness, wherein a loop-shaped string body is wound around and fixed to the periphery of a required portion of a wire harness main body or to the periphery of a portion of a wire bundle forming the wire harness main body in the required portion of the wire harness main body in such a manner that there can be formed an eye for securing thereto a wire harness removing hook when removing the wire harness from a vehicle.

Also, according to the 6th aspect of the invention, there is provided a wire harness, wherein a string body is used to form an eye for securing thereto a harness removing hook when removing the wire harness from a vehicle, and the end portion of the string body is tied and fixed to the periphery of a required portion of a wire harness main body or to the periphery of a portion of a wire bundle forming the wire harness main body in the above-mentioned required portion of the wire harness main body.

In view of the above, it is an object of the invention to provide a wire harness which, when dismantling a vehicle, can enhance the efficiency of an operation to remove the wire harness from the vehicle.

Also, it is another object of the invention to provide a wire harness capable of positively securing a hook thereto which is mounted on the leading end of a wire rope or the like to be pulled by a power source.

In attaining the above object, according to the 7th aspect of the invention, there is provided a wire harness, wherein a wire bundle forming the present wire harness is divided in a portion thereof so as to have a forked wire bundle section, and there is inserted a hollow cylindrical body into the forked wire bundle portion, and also wherein the hollow cylindrical body extends through the wire harness in the diameter direction thereof.

According to the 7th aspect, a hook can be secured by using the hollow cylindrical body inserted into the wire harness.

Also, in achieving the above object, according to the 8th aspect of the invention, there is provided a wire harness, wherein a string body is disposed along a wire bundle forming the present wire harness, the two end portions of the string body are bound together with the wire bundle by tape, and the central portion of the string body is exposed to the outside.

According to the 8th aspect, a hook can be secured by using the outwardly exposed central portion of the string body disposed in the wire harness.

DETAILED DESCRIPTION OF THE PREFERRED EMBODIMENTS

Now, description will be given below in detail of the preferred embodiments of the invention.

Figure 3:
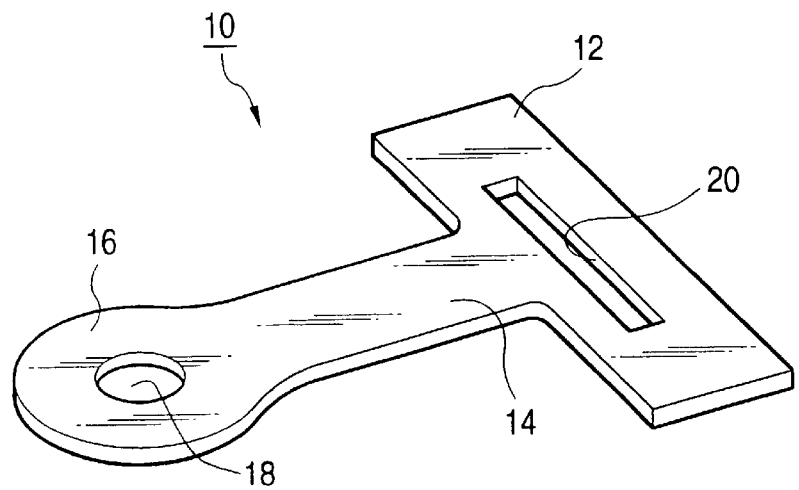
FIG. 3 is a perspective view of a knob for a wire harness according to a 1st embodiment of the invention.

FIG. 3 is a perspective view of a knob 10 according to a first embodiment of the invention, showing a developed state thereof. The knob 10, as a whole, has a T-like plane shape and comprises a rectangular-shaped base portion 12, a narrow and long belt portion 14 which extends perpendicularly from the middle portion of the base portion 12 in the longitudinal direction thereof, and an eye portion 16 formed in the leading end portion of the belt portion 14. The eye portion 16 has a round contour and includes a circular eye 18 formed in the central portion thereof. In the base portion 12, there is formed an elongated hole 20 having a length dimension which allows the eye portion 16 to pass through the elongated hole 20, while the elongated hole 20 is located in the longitudinal-direction central portion of the base portion 12 and extends in the longitudinal direction of the base portion 12.

Figure 1:
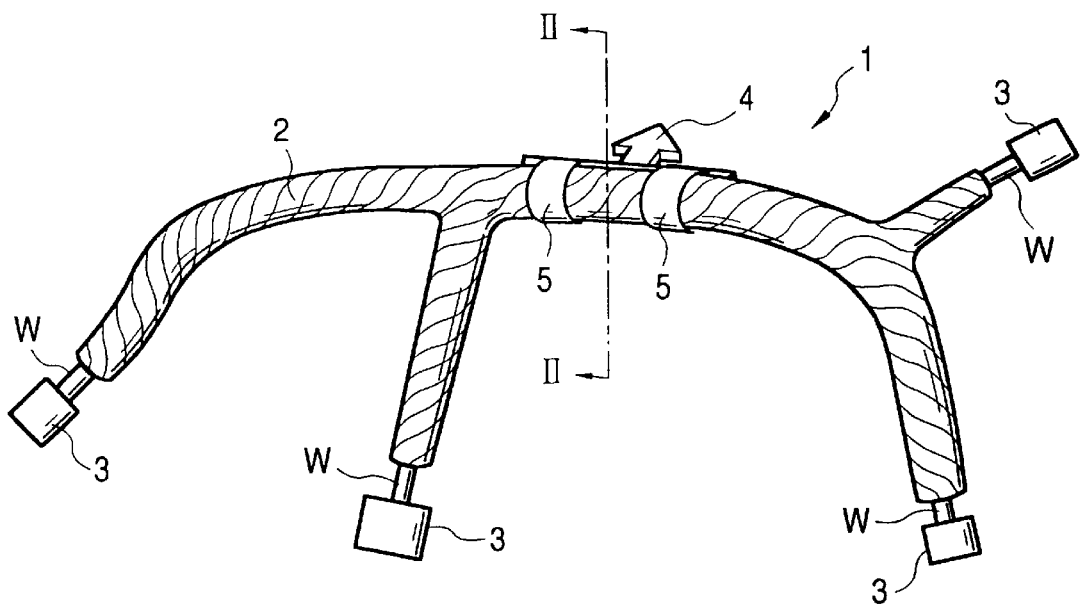
FIG. 1 is a perspective view of a wire harness, showing a general structure of a wire harness.
Figure 2A:
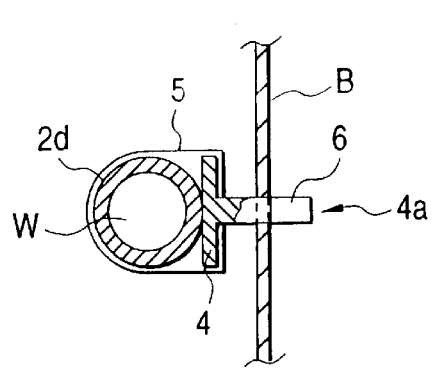
FIGS. 2A and 2B are section views taken along the line II—II shown in FIG. 1.
Figure 2B:
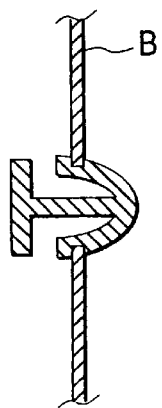
Figure 4:
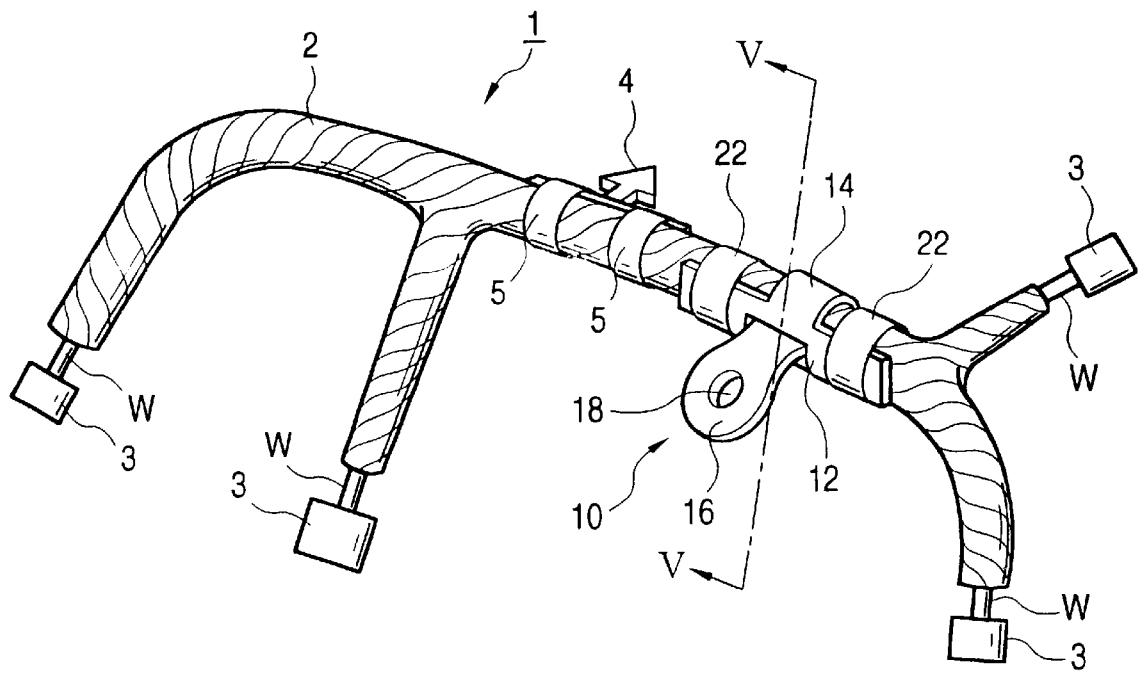
FIG. 4 is a plan view of a wire harness incorporating the knob shown in FIG. 4 thereinto.
Figure 5:
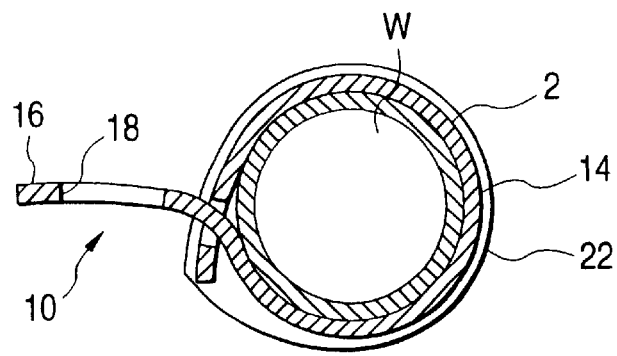
FIG. 5 is a section view taken along the line V—V shown in FIG. 4.

Now, FIG. 4 shows a state in which the above-mentioned knob 10 is mounted on a wire harness 1, and FIG. 5 is a section view thereof taken along the line V—V shown in FIG. 4. In these figures, the same parts as those discussed in the above-mentioned FIGS. 1 and 2 are given the same reference characters. To mount the knob 10 onto the wire harness 1, at first, the belt portion 14 is wound around the wire harness 1 and the eye portion 16 is inserted through the elongated hole 20 in the base portion 12. As a result of this, the knob 10 is held in the following manner: that is, the base portion 12 is arranged so as to extend along the axial direction of the wire harness, the belt portion 14 is situated so as to surround the outer periphery of the wire harness 1, and, the leading end portion of the knob 10, namely, the eye portion 12 passes through and projects outwardly of the elongated hole 20 of the base portion 12. Next, two strips of tape 22 are respectively wound around not only the wire harness 1 but also the two end portions of the base portion 12 to thereby fix the base portion 12 to the wire harness 1.

The operation to mount the knob 10 onto the wire harness 1 in this manner is generally carried out in a preparatory step when assembling a vehicle. However, this operation may also be executed before the vehicle is taken down. In this case, the fixation of the knob 10 by the tape 22 is not always indispensable. That is, the knob 10 may be fixed to the wire harness 1 by the tape 22 in such a manner that the knob 10 is secured to the wire harness 1 provisionally, or the fixing operation by the tape 22 may be omitted.

In dismantling the vehicle, a wire rope 30 is secured to a damper 28 of an arm 26 of a crane truck and a hook 32 (FIG.

6) mounted on the leading end of the wire rope 30 is secured to the round eye 18 of the knob 10 and, after then, by raising the damper 28 of the crane truck arm 26, the wire harness 1 is pulled up through the wire rope 30, hook 32 and knob member 10. As a result of this, the clamp 4 of the wire harness 1 is forcibly taken out from a through hole 6 formed in the vehicle body B, thereby being able to remove the wire harness 1 from the vehicle body B.

As the mounting portion of the knob 10 with respect to the wire harness 1, preferably, there may be selected a portion which is located near the clamp 4 because such portion allows a pulling force by the crane truck arm 26 to be transmitted directly to the clamp 4. If necessary, a plurality of knobs 10 may be mounted on the wire harness 1, a plurality of hooks 32 may be respectively secured to all of the knobs 10, and thus the plurality of hooks 32 may be used to remove the wire harness 1.

Generally, it is preferable that the knob 10 maybe molded of flexible synthetic resin into an integrally united body. The size of the circular eye 18 of the knob member 10, that is, the diameter of the circular eye 18 may be set according to the size of the hook 32 to be used. For example, the circular eye 18 may have a diameter of 15 mm or larger.

Figure 7:
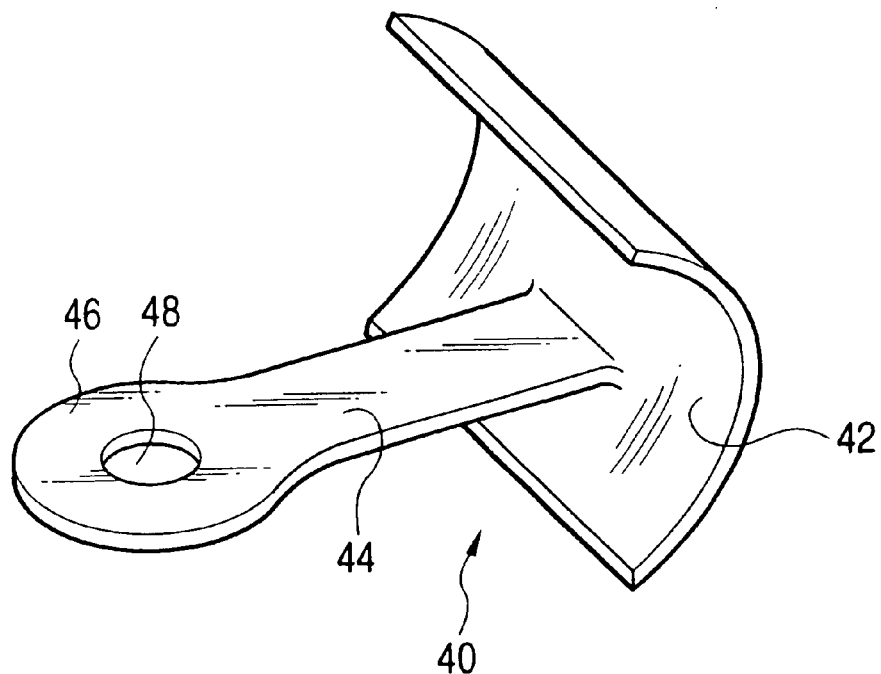
FIG. 7 is a plan view of a knob for a wire harness according to a 2nd embodiment of the invention.

Now, FIG. 7 is a perspective view of a knob 40 according to a 2nd embodiment of the invention. The present knob 40 includes a base portion 42 which has a rectangular shape as a whole, and the cross section of the base portion 42 is formed in a semicircular shape. The knob 40 further includes a lip portion 44 which extends in the diameter direction of the base portion 42 from the central portion of the inside of the base portion 42, and an eye portion 46 formed in the leading end portion of the lip portion 44, while the eye portion 46 includes a circular eye 48 formed in the central portion thereof. The knob 40, preferably, may be molded of relatively hard synthetic resin into an integrally united body.

Figure 8:
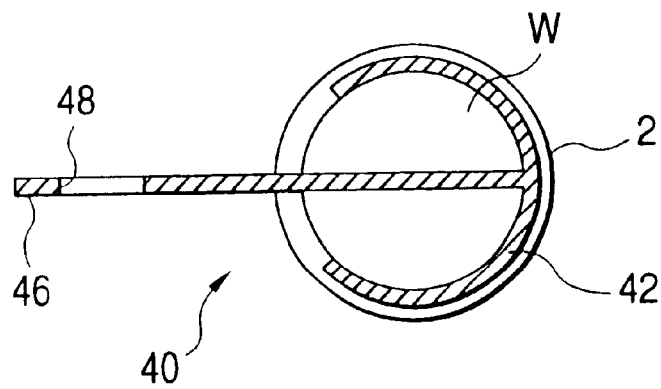
FIG. 8 is a section view of a wire harness incorporating the knob shown in FIG. 7 thereinto, corresponding to FIG. 5.

To mount the knob 40 according to the 2nd embodiment onto the wire harness 1, as shown in FIG. 8, at first, the lip portion 44 of the knob 40 is inserted in such a manner that it extends through a plurality of wire bundles W forming the wire harness 1 in the diameter direction thereof. That is, when producing the wire harness 1, the lip portion 44 of the knob 40 is inserted through the wire bundles W and the eye portion 46 of the knob 40 is projected outwardly of the wire bundles W and, after then, tape 3 is wound around the wire bundles W, whereby the base portion 42 of the knob 40 is united with the wire bundles W into an integral body by the tape 3.

In the wire harness 1 obtained in this manner, only the eye portion 46 of the knob 40 projects outwardly. In taking down the vehicle, to remove the wire harness 1 from the vehicle, similarly to the above-mentioned knob 10 according to the first embodiment, the wire rope 30 may be secured to the damper 28 of the crane truck arm 26 and the hook 32 (see FIG. 6) mounted on the leading end of the wire rope 30 may be secured to the circular eye 48 of the knob 40 and, after then, the damper 28 of the crane truck arm 26 may be raised up.

Figure 9:
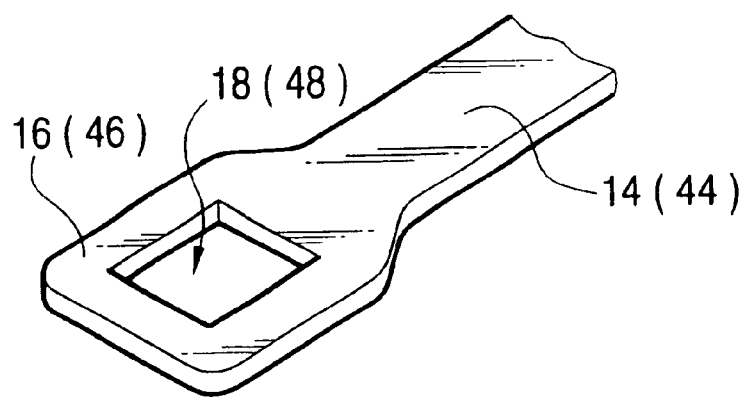
FIG. 9 is a partial plan view of modifications of the eye portion and eye.
Figure 10:
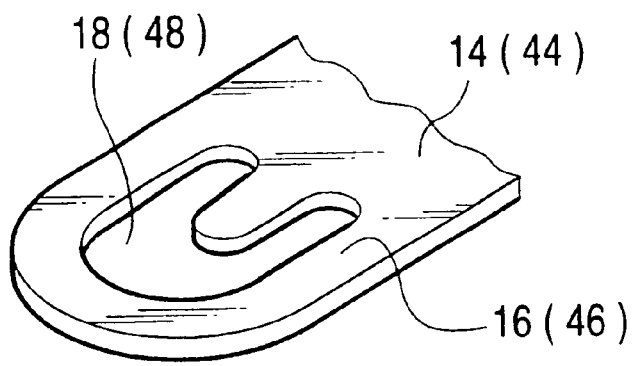
FIG. 10 is a partial plan view of another modifications of the eye portion and eye.

Although description has been given heretofore of the preferred embodiments of the invention, the present invention is not limited to the above-described 1st and 2nd embodiments but, for example, as the shapes of the eye portions 16, 46 and eyes 18, 48, as shown in FIGS. 9 and 10, various shapes can also be employed.

According to the invention, since the above-mentioned structure is employed, in dismantling a vehicle, for example, the hook mounted on a winch through a wire rope can be secured to the eye of the knob positively and easily to thereby be able to grip and pull out the wire harness from the vehicle, which makes it possible to carry out an operation to separate the wire harness from other parts of the vehicle.

Now, description will be given below in detail of a preferred embodiment of a wire harness according to the invention.

Figure 11:
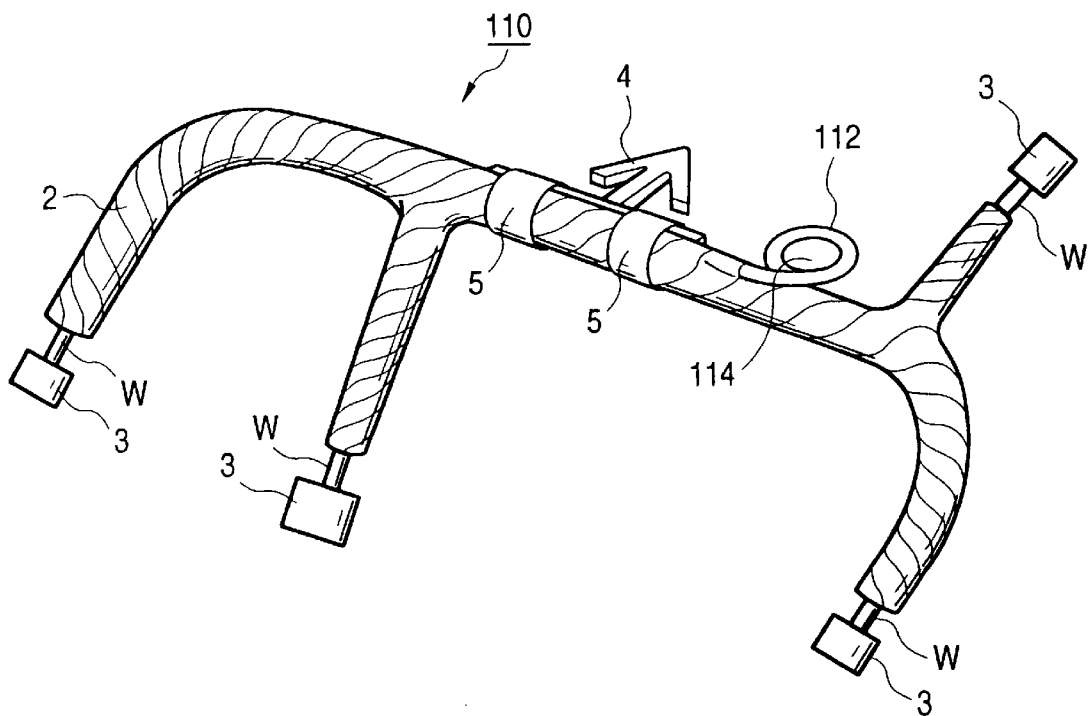
FIG. 11 is a perspective view of a wire harness according to the invention.

FIG. 11 shows a wire harness 110 according to the invention.

In FIG. 11, the same parts as those previously discussed in connection with the above-mentioned FIGS. 1 and 2 are given the same designations. In the wire harness 110, part wire 112 out of a wire bundle W composed of a plurality of wires bound together by tape 2 is exposed to the outside and the part wire 112 is rotated once to thereby form an eye 114.

Figure 12:
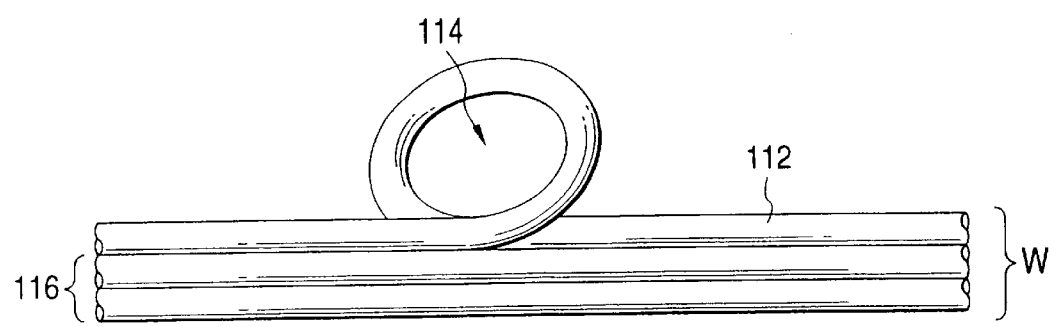
FIG. 12 is a typical view of part of some of a plurality of wire bundles forming a wire harness according to the invention and an eye formed by rotating once the intermediate portion of one of the wires of the wire bundles.

That is, as shown typically in FIG. 12, the part wire 112, which is included in each of the wire bundles W forming the wire harness 110, has a longer length dimension than that of the remaining wire 116 and the intermediate portion of the part wire 112 is rotated once to thereby form an eye 114 and, after then, by winding the tape 2 around the thus-formed respective wire bundles W to thereby produce a wire harness 110.

Referring here to the number of part wires 112 in which the eyes 114 are to be formed, as shown in FIG. 12, a single wire may be all right, or a plurality of wires may be used. However, it is not necessary that the eyes 114 are formed in all wires of the wire bundles W. Empirically, it is sufficient that the eyes 114 are formed in the wires at the most 70% of all wires of the wire bundle W.

As the position for forming the eye 114, preferably, a position near a clamp 4 may be selected because such position allows a pulling force by a crane truck (which will be discussed later) to be transmitted directly to the clamp 4. The eye 114 may also be formed at a plurality of positions of the wire harness 110. In this case, two or more eyes 114 may be formed in the same wire, or eyes 114 may be formed at mutually different positions in separate wires, whereby the wire harness 110 may include a plurality of eyes 114 which are spaced apart from one another.

When dismantling a vehicle, a wire rope 30 is secured to a damper 28 of an arm 26 of the crane truck and a hook (FIG. 6) mounted on the leading end of the wire rope 30 is secured to the eyes 114 of the wire harness 110; and, after then, by raising up the damper 28 of the crane truck arm 26, the wire harness 110 can be pulled up. As a result of this, the clamp 4 of the wire harness 110 is forcibly slipped out of a through hole 6 formed in a vehicle body B, so that the wire harness 10 can be removed from the vehicle body B.

The diameter of the eye 114 may be set according to the size of the hook 32 to be used and, empirically, the eye 114 may have a diameter of 15 mm or more.

According to the invention, since the above-mentioned structure is employed, in dismantling a vehicle, for example, the hook mounted on a winch through a wire rope can be secured to the eye of the knob positively and easily to thereby be able to grip and pull out the wire harness from the vehicle, which makes it possible to carry out an operation to separate the wire harness from other parts of the vehicle.

Now, description will be given below in detail of the preferred embodiments of a wire harness according to the invention.

At first, description will be given below of a 6th embodiment of a wire harness according to the invention with reference to FIGS. 13 to 15. The 6th embodiment is characterized in that a string body 207 having such a loop shape as shown in FIG. 13 is wound around and fixed to the periphery of a required portion of a wire harness main body (which is hereinafter referred to as a wire harness) 201 in such a manner that there can be formed an eye 209.

The eye 209 is used to remove the wire harness 201 from a vehicle when dismantling the vehicle: that is, a hook disposed in a removing instrument such as a damper of a crane truck is secured to the eye 209 in order to be able to achieve removal of the wire harness 201 from the vehicle. And, preferably, the eye 209 may be formed so as to have a dimension which allows the hook to be properly secured to the eye 209 and, empirically, the eye 209 may have a diameter of 15 mm or more. The material of the string-shaped body 207 is not limited to special material, that is, the loop-shaped string body 207 may be formed of any material, provided that it has a required strength; for example, it is also possible to use an ordinary string which is formed of a chemical fiber or cotton.

Figure 6:
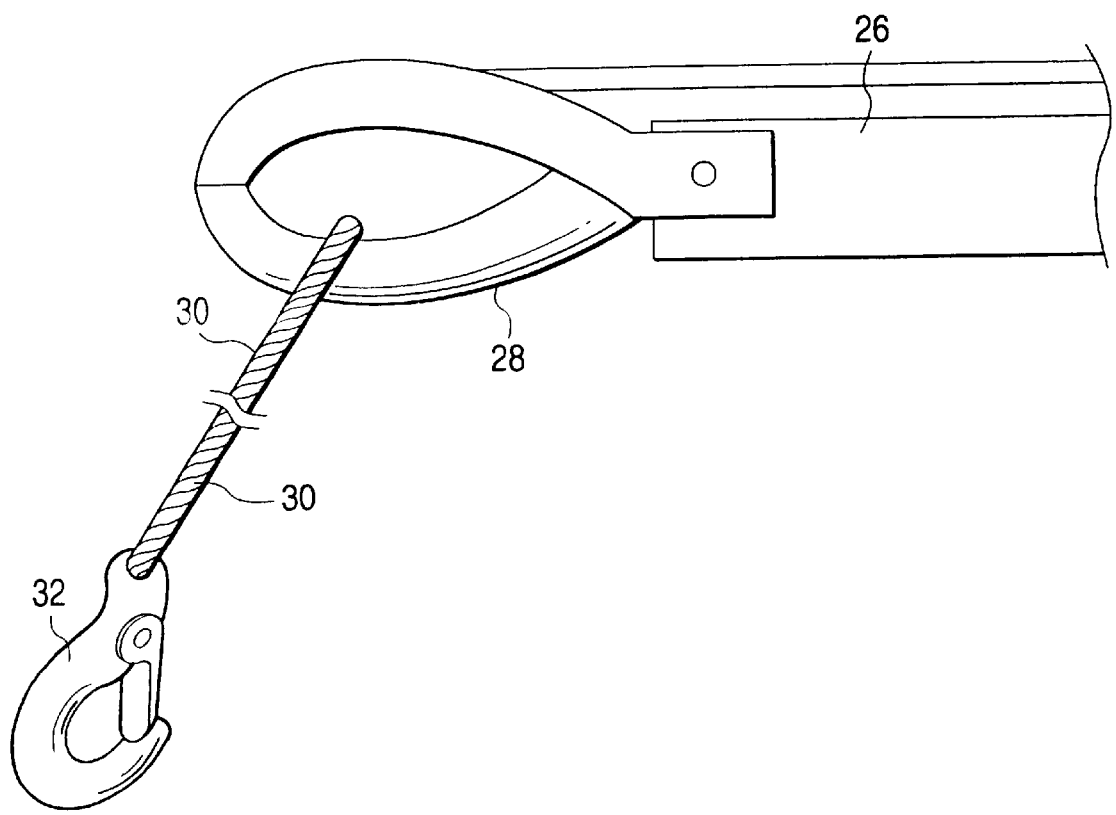
FIG. 6 is an explanatory view of a state in which a hook is mounted through a wire rope on a damper of a crane truck used when taking down a vehicle.
Figure 13:
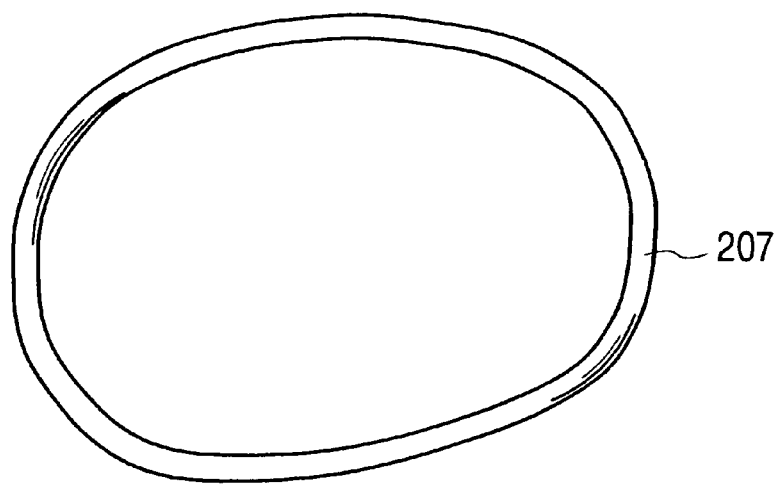
FIG. 13 is a view of a string body used as wire harness removing means according to the invention.
Figure 14:
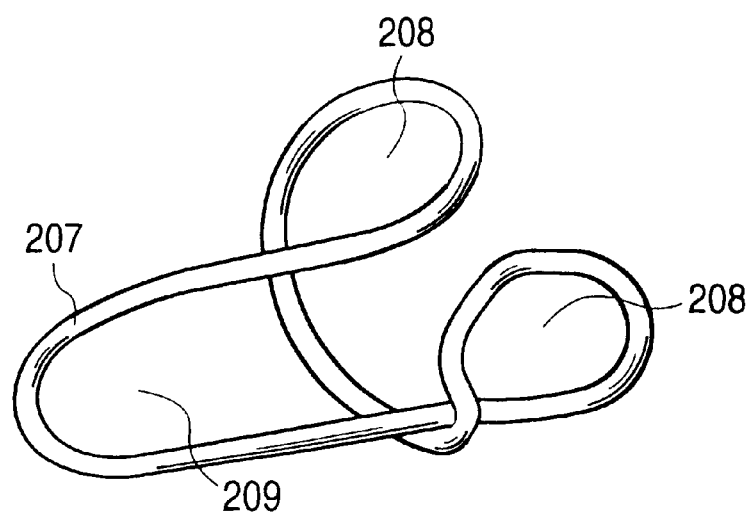
FIG. 14 is an explanatory view to show how the loop-shaped string body shown in FIG. 13 is wound around and fixed to the periphery of a wire harness.
Figure 15:
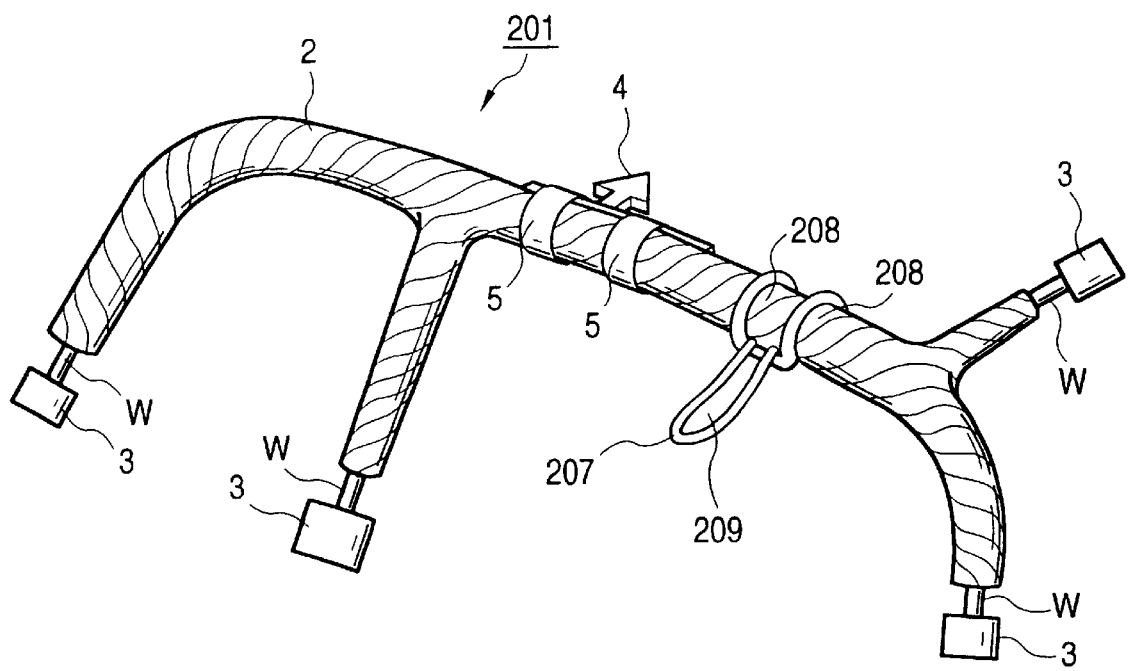
FIG. 15, similarly to FIG. 1, is a perspective view of a wire harness, showing a state in which the loop-shaped string body is wound around and fixed to the periphery of a wire harness; and, FIG. 16 is an explanatory view of a 7th embodiment according to the invention.

Now, FIG. 14 is an explanatory view of the loop-shaped string body 207 shown in FIG. 13, showing how it is wound around and fixed to the periphery of the wire harness 201; and, in this case, the wire harness 201 is made to pass through between small loops 208 and 208 respectively formed in the string body 207. Also, FIG. 15, similarly to FIG. 1, shows a state in which the loop-shaped string body 207 is wound around and fixed to the periphery of the 15 wire harness 201. In FIG. 6, the components thereof equivalent to those shown in FIG. 1 are given the same reference characters and marks.

In the above embodiment, a single string body 207 is used but, according to the invention, it is also possible to use a plurality of string bodies 207 while they are bundled together.

Also, in order to be able to fix the string body 207 to the periphery of the wire harness 201 more positively, there can also be used known fixing means such as adhesive tape or the like.

With use of the above-mentioned structure, the eye, to which the hook for removing the wire harness is to be secured, can be formed very simply using the loop-shaped string body, which in turn can enhance the efficiency of an operation to remove the wire harness from the vehicle.

Figure 16:
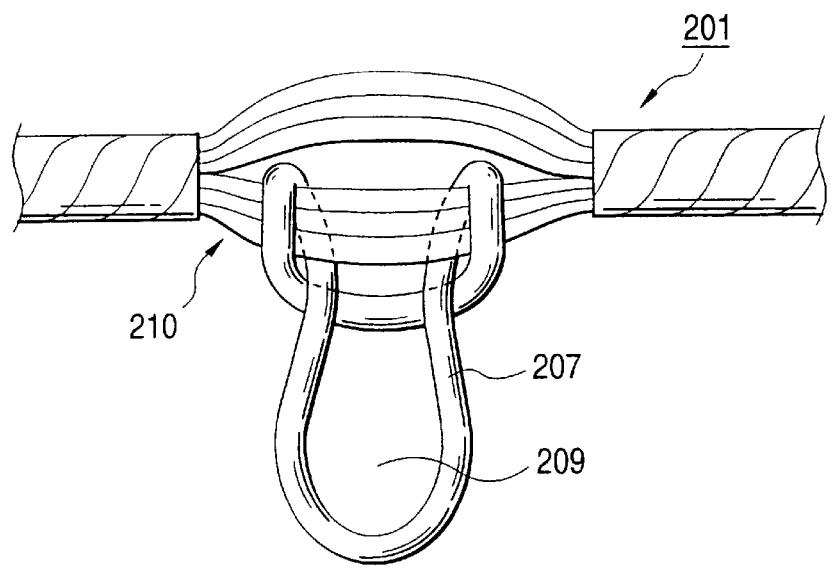

Next, description will be given below of a 7th embodiment of a wire harness according to the invention with reference to FIG. 16. The second embodiment is characterized in that such loop-shaped string body 207 as shown in FIG. 13 is wound around and fixed to the periphery of a portion 210 of a wire bundle forming a wire harness 201 in a required portion of the wire harness 201 in such a manner that an eye 209 can be formed.

That is, in the 7th embodiment, instead of the fact that, in the 6th embodiment, the string body 207 is wound around and fixed to the periphery of the required portion of the wire harness 201, the string body 207 is wound around and fixed to the periphery of the portion 210 of the wire bundle forming the wire harness 201 in the required portion of the wire harness 201. The other remaining portions of the structure of the second embodiment are similar to those of the 6th embodiment and thus the description thereof is omitted here in order to avoid the repetition of the same description.

In the 7th embodiment, the portion 210 of the wire bundle, to which the string body 207 is wound and fixed, is exposed by removing a portion of the cover member (binding tape) of the wire harness 201. The number of wires included in the portion 210 of the wire bundle should be the number that, when removing the wire harness 201 from the vehicle in the vehicle dismantling operation, can prevent the wire harness from being broken or damaged as the hook of the removing instrument is secured to eyes 208 formed in the string body 207 and is then pulled.

With use of the structure according to the 7th embodiment, similarly to the first embodiment, the eye, to which the hook for removing the wire harness can be secured, can be formed very simply using the loop-shaped string body, which makes it possible to enhance the efficiency of the operation to remove the wire harness from the vehicle.

In the above-mentioned embodiments, the loop-shaped string body is used to form the wire harness removing means. However, according to the invention, the present wire harness removing means can also be formed using one or more non-loop-shaped, that is, normal string bodies. In this case, an eye is formed using a portion of the string body and the end portion of the string body is tied and fixed to the periphery of a required portion of the wire harness 201, or to the periphery of the portion 210 of the wire bundle forming the wire harness 201 in the required portion of the wire harness 201. For example, the eye is previously formed using the central portion of a single string body and, next, the two ends of the string body are respectively inserted through part of the wire harness or wire bundle and are then connected together, thereby being able to form wire harness removing means. By the way, the manner of connection of the string body in order to form the eye as well as the manner of tying of the end portion of the string body to the wire harness side are not limited to the above-mentioned manners but there can also be used other various known manners.

With use of the last-mentioned structure, similarly to the previously described first and second embodiments, there can be obtained excellent effects.

According to the invention, thanks to employment of the above-mentioned structures, in the vehicle dismantling operation, the hook of the wire harness removing instrument can be secured to the eye positively and easily and, after then, the wire harness can be gripped and pulled out positively and easily, which makes it possible to carry out an operation for separation of the parts of the scrapped vehicle according to types with enhanced efficiency.

Now, description will be given below in detail of the preferred embodiments of a wire harness according to the invention with reference to the accompanying drawings.

Figure 17:
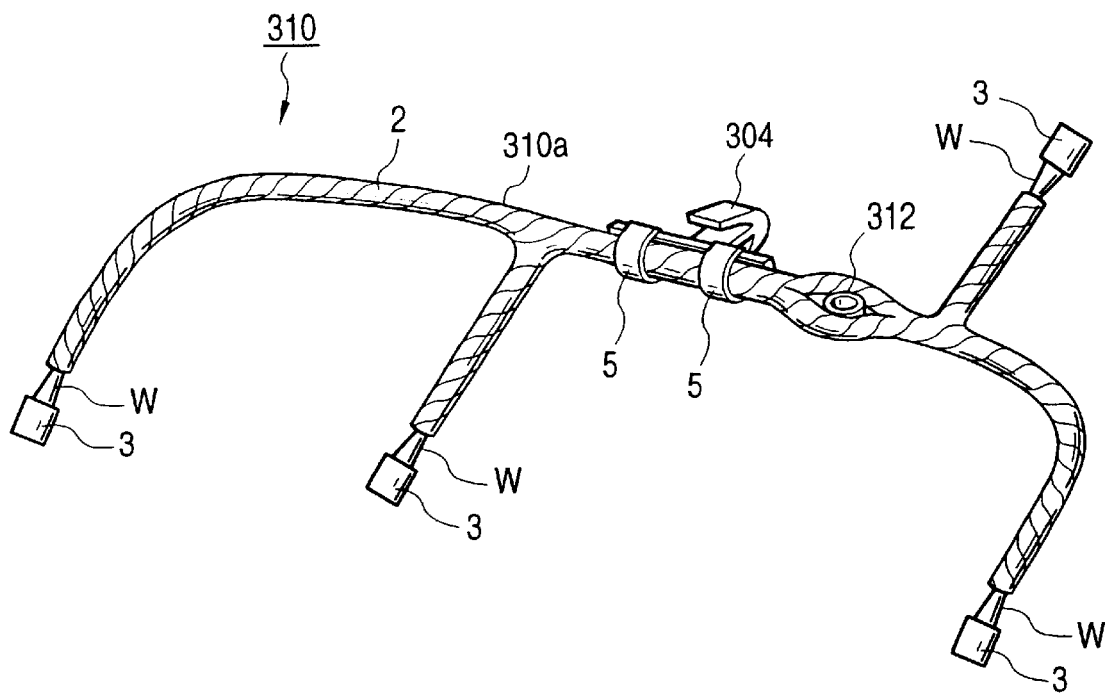
FIG. 17 is a perspective view of a wire harness according to an 8th embodiment of the invention.
Figure 18:
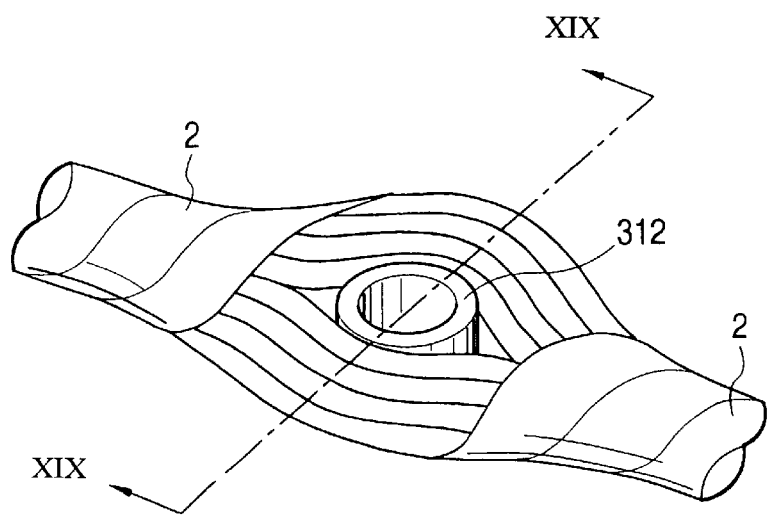
FIG. 18 is an enlarged view of the main portions of the wire harness according to the 8th embodiment of the invention.
Figure 19:
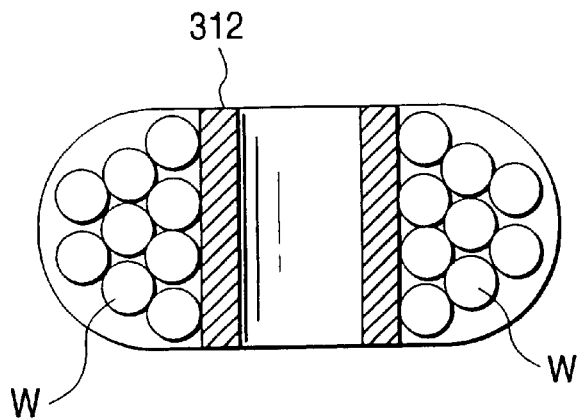
FIG. 19 is a section view taken along the line V—V shown in FIG. 18.

FIG. 17 is a perspective view of a wire harness 310 according to an 8th embodiment of the invention, FIG. 18 is an enlarged view of the main portions of the wire harness 310, and FIG. 19 is a section view taken along the line XIX—XIX shown in FIG. 18. The wire harness 310, similarly to the previously described conventional wire harness 1 (FIG. 1), is produced in such a manner that a plurality of wire bundles W are bound together and tape 302 is then wound around the wire bundles W; and, the wire harness 310 further includes connectors 3 and a clamp 304. Therefore, the same components of the wire harness 310 as those of the conventional wire harness 1 are given the same reference characters and thus the description thereof is omitted here.

The wire harness 310 includes a hollow cylindrical body 312 which is inserted into the intermediate portion of a base portion 310a thereof, while the hollow cylindrical body 312 extends through the wire harness 310 in the diameter direction thereof.

The hollow cylindrical body 312, preferably, maybe formed of rigid plastic material and also may be formed of insulating material. Also, in the present embodiment, the hollow cylindrical body 312 is shown in such a manner that it has a circular cross section. However, the cross section shape of the hollow cylindrical body 312 is not limited to this but it is also possible to use a hollow cylindrical body having an arbitrary cross section shape. Referring here to a concrete manner of producing the wire harness 310, the wire bundle W is divided in a portion thereof so as to have a forked wire bundle portion, the hollow cylindrical body 312 is inserted into the forked wire bundle portion, and, next, the tape 302 is tightly wound around them. In this manner, the wire harness 310 with the hollow cylindrical body 312 fastened by and within the wire bundles W can be produced.

When dismantling the vehicle, a hook (not shown) is secured to the hollow cylindrical body 312 inserted into the wire harness 310, and the hook is then pulled through a wire rope (not shown) by a traction machine such as a winch (not shown) or the like, so that the wire harness 310 can be removed from the vehicle.

Figure 20:
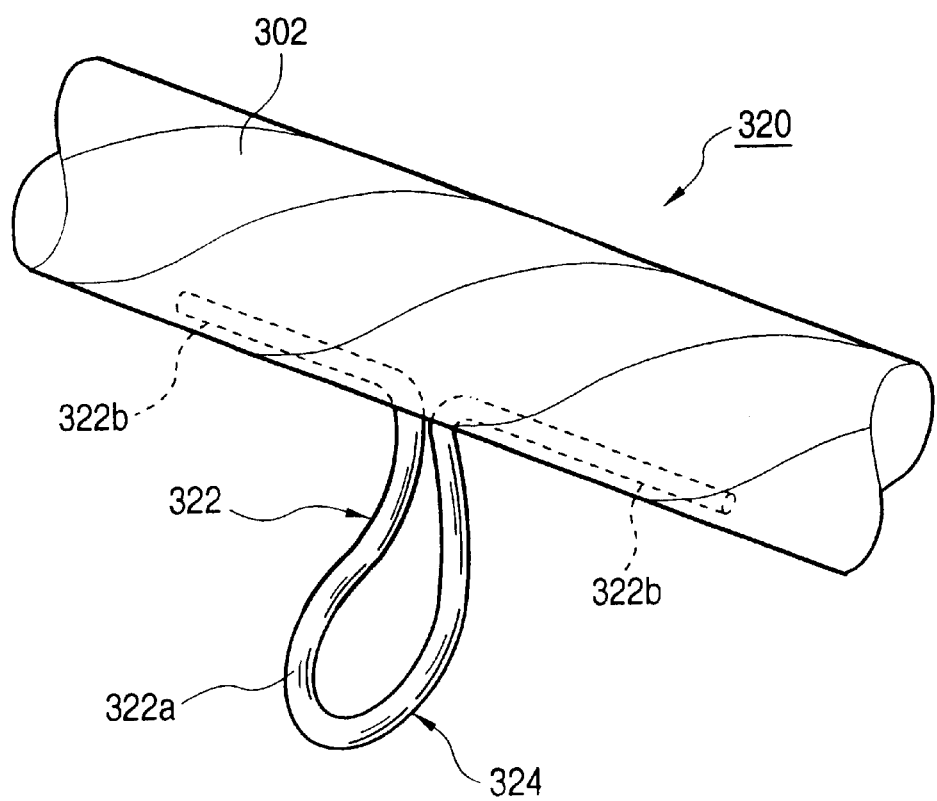
FIG. 20 is an enlarged view of the main portions of a wire harness according to a 9th embodiment of the invention.

Now, FIG. 20 is an enlarged view of the main portions of a wire harness 320 according to a 9th embodiment of the invention. The wire harness 320 according to the 9th embodiment includes a securing portion 324 which is formed by a string body 322 disposed so as to extend along wire bundle W. Referring here to a concrete manner of producing the wire harness 320, at least one string body 322 is disposed along the wire bundle W in such a manner that the central portion 322a of the string body 322 is exposed to the outside and the two end portions 322b of the string body 322 are situated close to each other and, after then, the two end portions 322b of the string body 322 are bound together with the wire bundle W using tape 302.

When taking down the vehicle, a hook (not shown) is secured to the securing portion 324 formed in the wire harness 320, and the hook is then pulled through a wire rope (not shown) by a traction machine such as a winch (not shown) or the like, so that the wire harness 320 can be removed from the vehicle.

As the provision position of the hollow cylindrical body 312 with respect to the wire harness 310 as well as the provision position of the securing portion 324 (string body 322) with respect to the wire harness 320, preferably, there may be selected a position which is close to the clamp 304, because such position permits a tractive force given by the hook to be transmitted directly to the clamp 304 in the vehicle dismantling operation. If necessary, a plurality of hollow cylindrical bodies 312 or string bodies 322, which are spaced from one another in the axial direction of the wire harness 310, 320, may also be mounted on the wire harness 310, 320.

According to the invention, thanks to employment of the above-mentioned structures, in the vehicle dismantling operation, the wire harness can be gripped and pulled out in such a manner that a hook mounted through a wire rope on a winch or the like can be positively and easily secured to a hollow cylindrical body or to the outwardly exposed central portion of a string body. This makes it possible to carry out with high efficiency an operation to collect the parts of the vehicle by type.

What is claimed is:

1. A wire harness comprising:

a clamp mounted on said wire harness for securing the wire harness to a vehicle body; and a knob mounted on said wire harness, said knob having a belt portion that is wound around the wire harness so that the belt portion surrounds an outer periphery of the wire harness, said knob having a grip located substantially opposite to the clamp, wherein the knob is stronger than a force with which said clamp is incorporated to a vehicle, said knob being provided at one or more positions of an outer periphery of said wire harness.

2. The wire harness as set forth in claim 1, wherein said knob is made of plastic.

3. A wire harness comprising:

a clamp amounted on said wire harness for securing the wire harness to a vehicle body; and a knob mounted on said wire harness, said knob having a belt portion that is wound around the wire harness so that the belt portion surrounds an outer periphery of the wire harness, said knob having a grip located substantially opposite to the clamp, wherein the knob is stronger than a force with which said clamp is incorporated into the vehicle body and used for easily removing with a hook of a crane said wire harness from a vehicle.

4. A wire harness comprising:

a plurality of clamps and a knob, wherein said clamps and said knob are mounted on said wire harness so that said knob is stronger than a force with which said clamps are incorporated into a vehicle body, said knob further comprising:

a belt portion that is wound around the wire harness so that the belt portion surrounds an outer periphery of the wire harness;

an eye portion exposed outwardly of said wire harness and located substantially opposite to the clamp; and an eye formed in said eye portion for securing a hook.

5. The wire harness as set forth in claim 4, wherein said knob includes a base portion extending along said wire harness in an axial direction thereof, and two end portions of said knob are respectively fixed to said wire harness by tape to thereby fix said knob to said wire harness.

* * * * *